United States Patent [19]

McCormick

[11] Patent Number: 4,556,445
[45] Date of Patent: * Dec. 3, 1985

[54] APPARATUS FOR ATTACHING CONTAINER ENDS TO CONTAINER BODIES

[75] Inventor: Dennis J. McCormick, Glendale Heights, Ill.

[73] Assignee: Vercon, Inc., Dallas, Tex.

[ * ] Notice: The portion of the term of this patent subsequent to Mar. 8, 2002 has been disclaimed.

[21] Appl. No.: 391,116

[22] Filed: Jun. 23, 1982

[51] Int. Cl.4 .............................................. B29C 27/08
[52] U.S. Cl. .................................. 156/423; 156/73.5; 156/82; 156/293; 156/497; 156/499; 156/567; 228/2

[58] Field of Search ...................... 156/73.5, 567, 580, 156/293, 497, 499, 423, 82; 279/1 D; 493/105, 108, 133, 135; 228/2

[56] References Cited

U.S. PATENT DOCUMENTS

| | | | |
|---|---|---|---|
| 3,128,215 | 4/1964 | Hood et al. | 156/82 X |
| 3,663,027 | 5/1972 | Klipping | 279/1 D X |
| 4,140,569 | 2/1979 | Yealy | 156/580 |
| 4,310,366 | 1/1982 | Van Manen | 156/69 |
| 4,515,651 | 5/1985 | MacLaughlin et al. | 156/423 |

Primary Examiner—Robert A. Dawson
Attorney, Agent, or Firm—Michael J. Caddell; M. Norwood Cheairs

[57] ABSTRACT

A method and apparatus for attaching plastic ends to plastic or plastic coated rims of container bodies by heating the ends, to soften the material of the rims, and then spin welding the ends on the bodies.

27 Claims, 12 Drawing Figures

FIG. I

APPARATUS FOR ATTACHING CONTAINER ENDS TO CONTAINER BODIES

BACKGROUND OF THE INVENTION

1. Field of the Invention

This invention relates to a method and apparatus for attaching molded plastic ends to cylindrical composite cans or other cylindrical bodies.

2. Description of the Prior Art

A search of the pertinent prior art in the U.S. Patent and Trademark Office disclosed the following U.S. Letters Patent: 1,433,251; 1,439,609; 1,448,026; 1,540,321; 2,042,733; 2,101,291; 2,272,073; 2,445,214; 2,531,914; 2,546,926; 2,760,551; 2,788,834; 3,052,926; 3,111,063; 3,128,215; 3,144,495; 3,144,495; 3,191,223; 3,216,874; 3,220,908; 3,245,858; 3,297,504; 3,316,135; 3,332,209; 3,333,571; 3,359,610; 3,424,343; 3,437,343; 3,475,243; 3,494,817; 3,499,068; 3,523,355; 3,607,581; 3,669,809; 3,701,708; 3,708,375; 3,712,771; 3,726,748; 3,735,896; 3,788,029; 3,791,894; 3,908,572; 3,960,624; 4,095,390; 4,198,901; 4,226,652; Re. 25,302; Re. 29,448.

None of the prior art uncovered in the search disclosed a method and apparatus which includes flame treatment in the spin welding operation.

SUMMARY OF THE INVENTION

Composite cans, the tubular bodies of which are formed primarily of paperboard, have in the past customarily been provided with metal ends which are attached by a seaming operation done on standard seaming equipment.

Recently it has been found that plastic ends for composite cans in many instances function just as well as metal ends, and for certain uses they have several advantages over metal ends, for example: the cost of plastic material is less than that of metal; plastic ends will not rust; and cans with plastic ends move along filling lines much more quietly than cans with metal ends. Additionally it is easier to incorporate a stacking feature in a plastic end than in a metal end. An example of one design of molded plastic end is disclosed in U.S. Pat. appl. Ser. No. 280,063 filed July 2, 1981 and now abandoned.

Plastic ends may be secured to can bodies in basically two ways: primary attachment, wherein the ends are formed with or attached to the bodies by an insert injection molding process; and secondary attachment, wherein the ends are attached to the bodies in a separate attaching operation utilizing any of several known methods, the most common of which is by gluing.

One method of secondary attachment for molded plastic ends is a process known as "spin-welding", wherein a can end and a can body, having a plastic coating adjacent its end, are rotated relative to each other to soften the plastic of each piece by frictional heating and thereby bond or weld them together.

This invention relates to an improved method and apparatus for attachment of a plastic end to a plastic or plastic coated can body by spin welding.

It is an object of the invention to provide an improved apparatus for spin-welding which can be operated more efficiently and at much higher speeds than conventional spin-welding equipment.

A more specific object of the invention is the provision of both a method and apparatus for expediting the spin-welding process and also improving the quality of the bond between the can end and the can body by flame treating one of the pieces.

These and other objects of the invention will be apparent from an examination of the following description and drawings.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
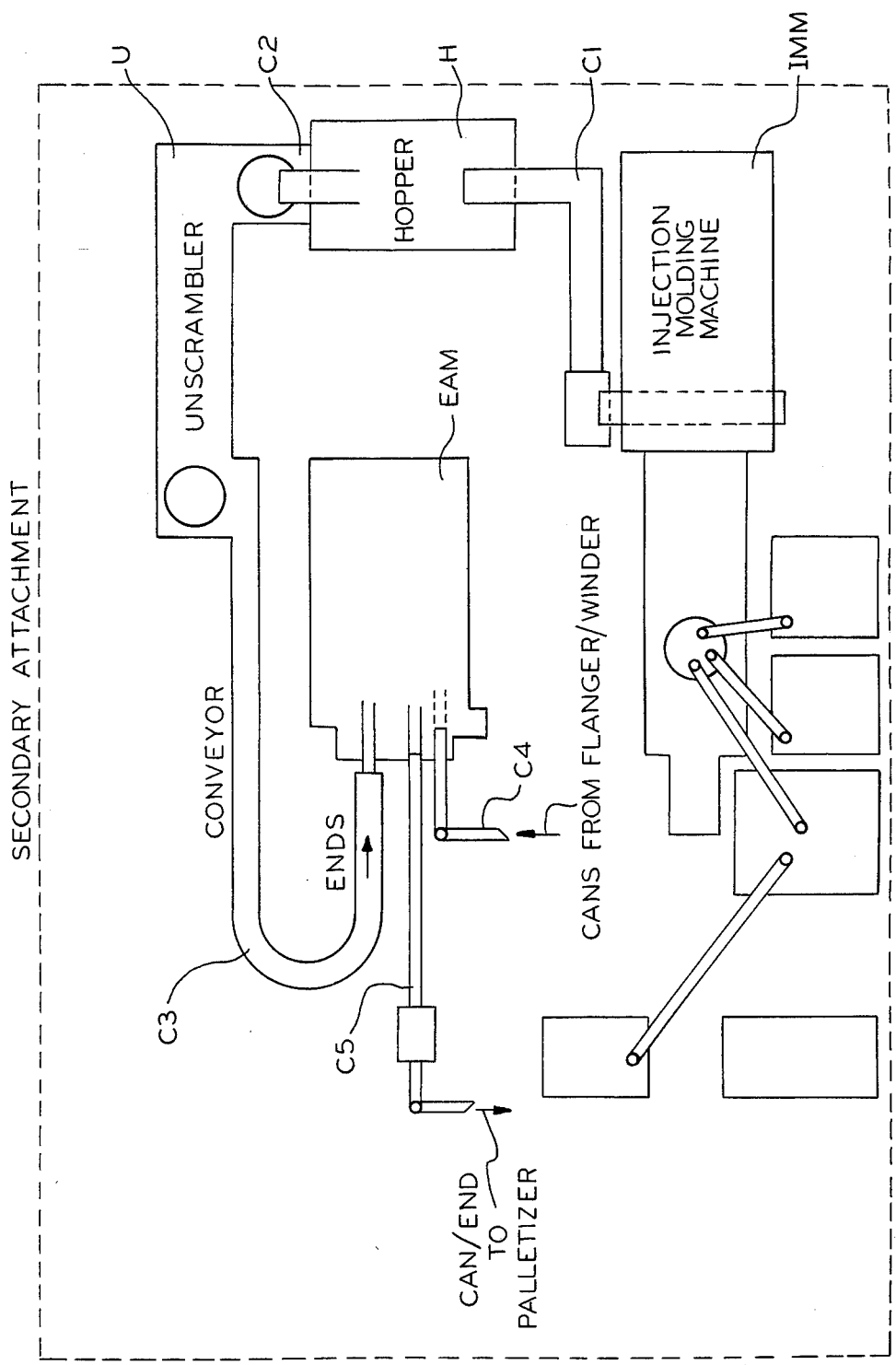
FIG. 1 is a schematic diagram of a suggested floor plan of a can producing plant, illustrating the location of an end attachment machine in relation to associated equipment.

Referring now to the drawings for a better understanding of the invention, and particularly to FIG. 1, it will be seen that the end attachment machine, indicated generally at EAM, is shown in the floor diagram or schematic flow chart in its relation to the other related equipment employed in the complete process of the invention.

The purpose of the invention is to attach by welding a molded plastic closure or can end E to a composite can body B. The ends E may be formed on an injection molding machine IMM and transferred in bulk by a conveyor C1 to a hopper H. From the hopper H, the ends are carried by a conveyor C2 to an unscrambling and orienting device U. Here the can ends are oriented, with their outer surfaces facing upward, and then transferred single file from the unscrambler U, on a conveyor C3, to the end attachment machine EAM.

At the same time as ends E are being fed into machine EAM, can bodies B are being fed into machine EAM by a conveyor C4, which brings the can bodies from can body forming equipment.

After the ends E are attached to the bodies B, the bodies with ends attached BE are transferred from machine EAM by a conveyor C5 to a palletizer area where they are loaded for shipment or temporary storage.

As the specific details of the structures and operations of the injection molding machine, hopper, unscrambler, and various conveyors do not form a part of present invention, such details are not disclosed in this application. However, their locations in relation to that of the end attachment machine machine are essential to the complete end attaching process or method embodied in the present invention and are shown in FIG. 1.

Figure 2:
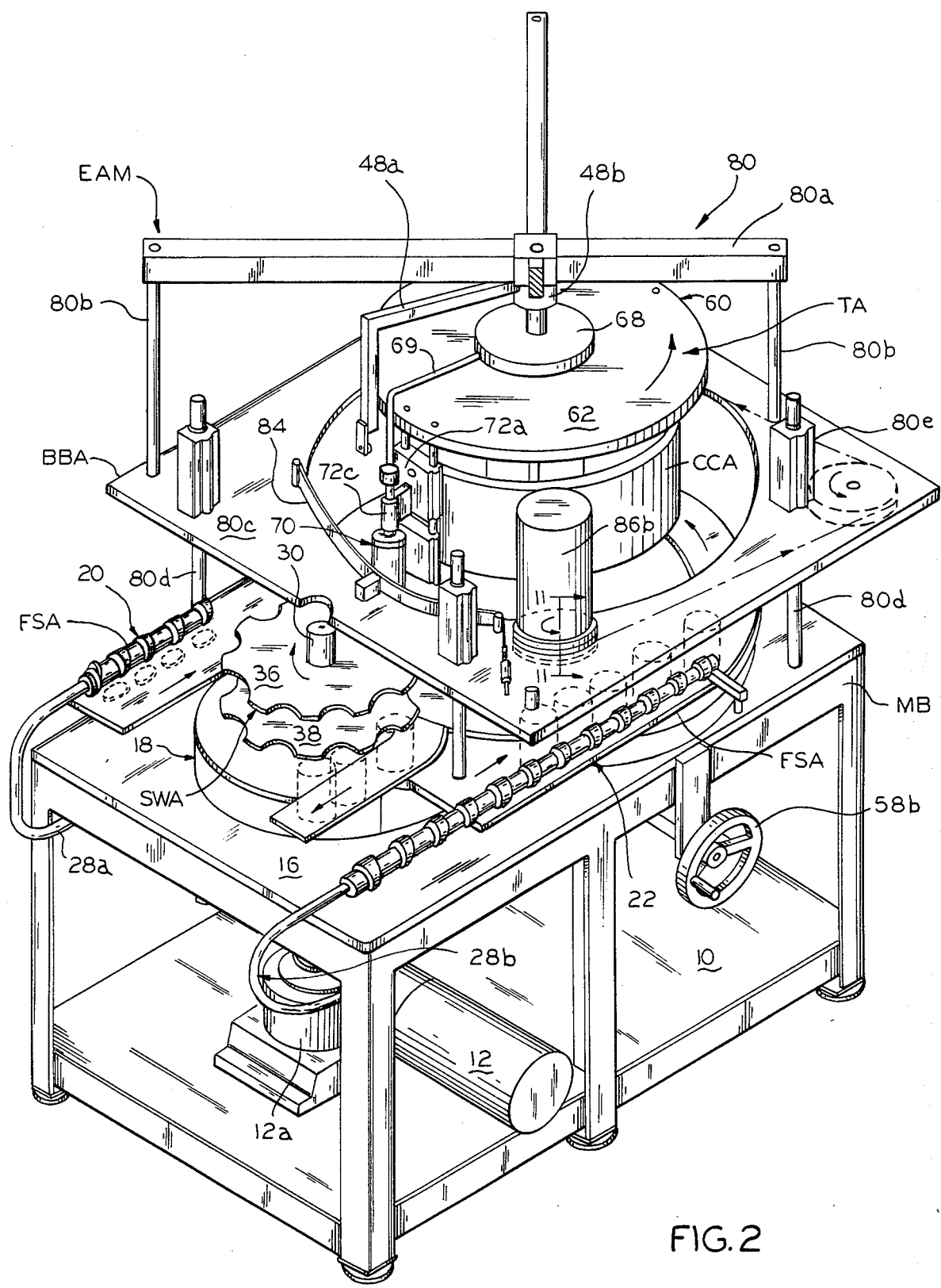
FIG. 2 is a fragmentary perspective view of an end attaching machine embodying features of the invention.
Figure 3:
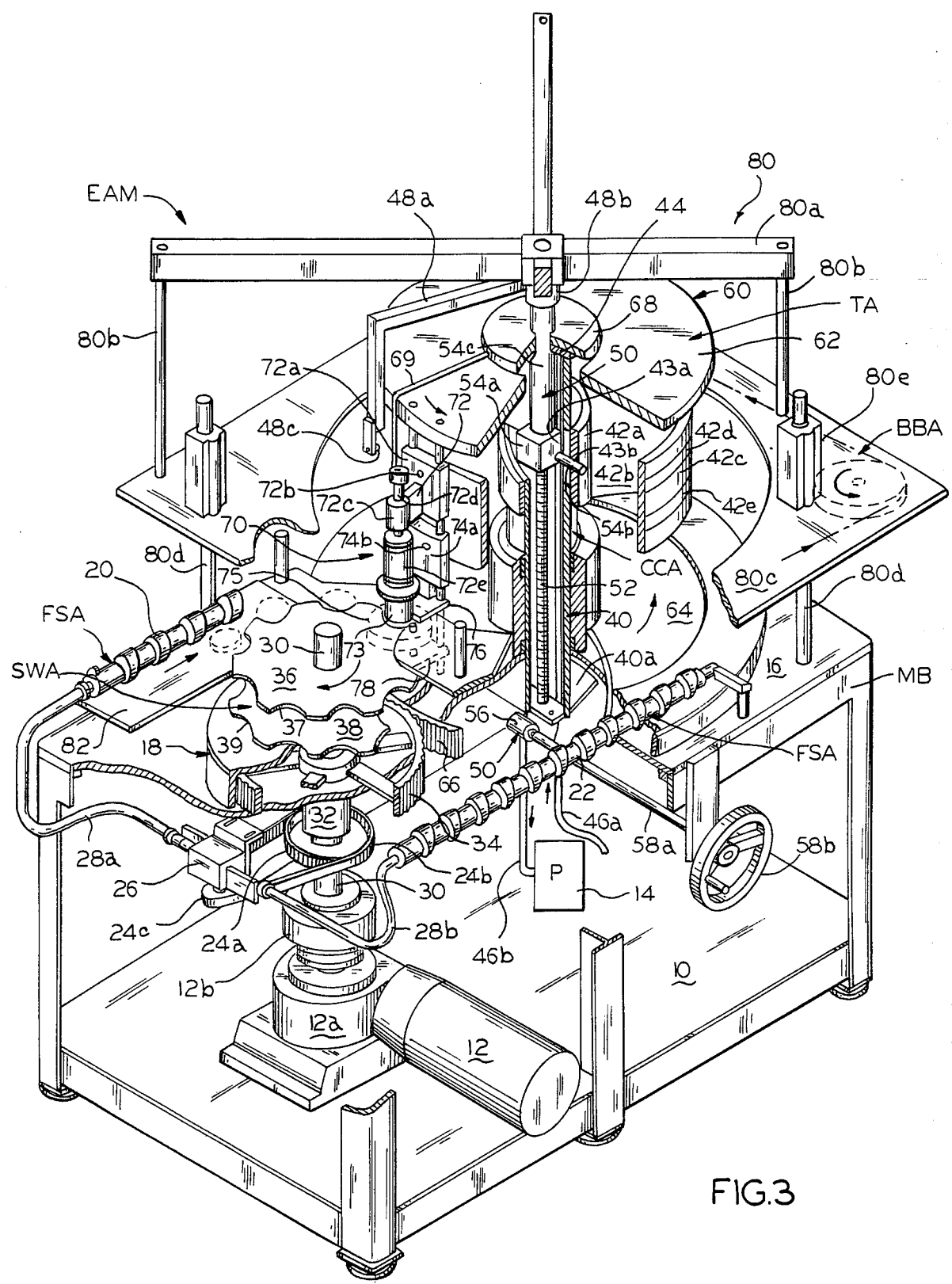
FIG. 3 is a view similar to FIG. 2, but with portions of the structure broken away.

Turning now to FIGS. 2 and 3 it will be seen that there is illustrated an end attachment machine, indicated generally at EAM, embodying features of the present invention. The primary components of the machine are as follows: a machine base MB, timing or feed screw assembly FSA, star wheel shaft assembly SWA, center column assembly CCA, turret assembly TA, and belt-drive/burner assembly BBA.

DESCRIPTION OF THE MACHINE BASE

Machine base MB is a frame/housing structure which includes a lower plate or deck 10 on which are mounted: a main motor 12, gear reducer 12a, coupler 12b, lower end of star wheel shaft 30, and portions of feed screw assembly FSA, described in detail later herein. Also, mounted within and/or on machine base MB are portions of a jack screw sub-assembly 50, vacuum pump 14, and the electrical, air, and gas control equipment (not shown).

Machine base MB also includes an upper plate or deck 16, to the underside of which are mounted the following: a feed screw drive train gear box 26, star wheel shaft bearing housing 32, and the lower end of center column 40.

Mounted on the upper side of deck 16 are: upper portions of the feed screw, star wheel shaft, and center column assemblies, FSA, SWA, and CCA, respectively, turret assembly TA, gear housing 18, which is common to the star wheel shaft and turret assemblies, and the belt-drive/burner assembly BBA.

DESCRIPTION OF THE FEED SCREW ASSEMBLY

Feed screw assembly FSA includes a pair of horizontally disposed timing or feed screws positioned above machine base upper deck at opposite sides thereof. Feed screw 20 transfers can ends E to end star wheel 36, which in turn transfers the ends to the initial work station of the EAM, and feed screw 22 transfers can bodies B to another work station, as hereinafter described. Both of the feed screws are driven by a feed screw drive train which includes a driver sprocket 24a, mounted on star wheel shaft 30, timing belt 24b, driven sprocket 24c, gear box 26, and flexible shafts 28a and 28b, which connect gear box 26 to the can end feed screw 20 and the can body feed screw 22, respectively.

DESCRIPTION OF THE STAR WHEEL ASSEMBLY

Referring to FIG. 3, it will be seen that star wheel shaft assembly SWA, in addition to shaft 30 and bearing housing 32, includes a driver pinion gear 34, which is mounted on shaft 30 above machine base upper deck 16 for engagement with driven ring gear 66 of turret assembly TA. Both gears are enclosed within a common, pear-shaped gear housing 18 mounted on upper deck 16.

The star wheel shaft assembly also includes a pair of upper and lower star wheels 36 and 38, respectively, which are mounted on shaft 30 above gear housing 18. Upper star wheel 36 is positioned inboardly adjacent can end feed screw 20 and presents a plurality of pockets or recesses 37 for cooperation therewith to transfer the can ends to the initial work station of the machine. Lower star wheel 38 is positioned under star wheel 36 and presents a plurality of pockets 39 which transfer can bodies, with ends attached BE, from the work station to conveyor C5, where they are transported to a palletizer in a shipping or storage area.

DESCRIPTION OF THE CENTER COLUMN ASSEMBLY

Figure 4:
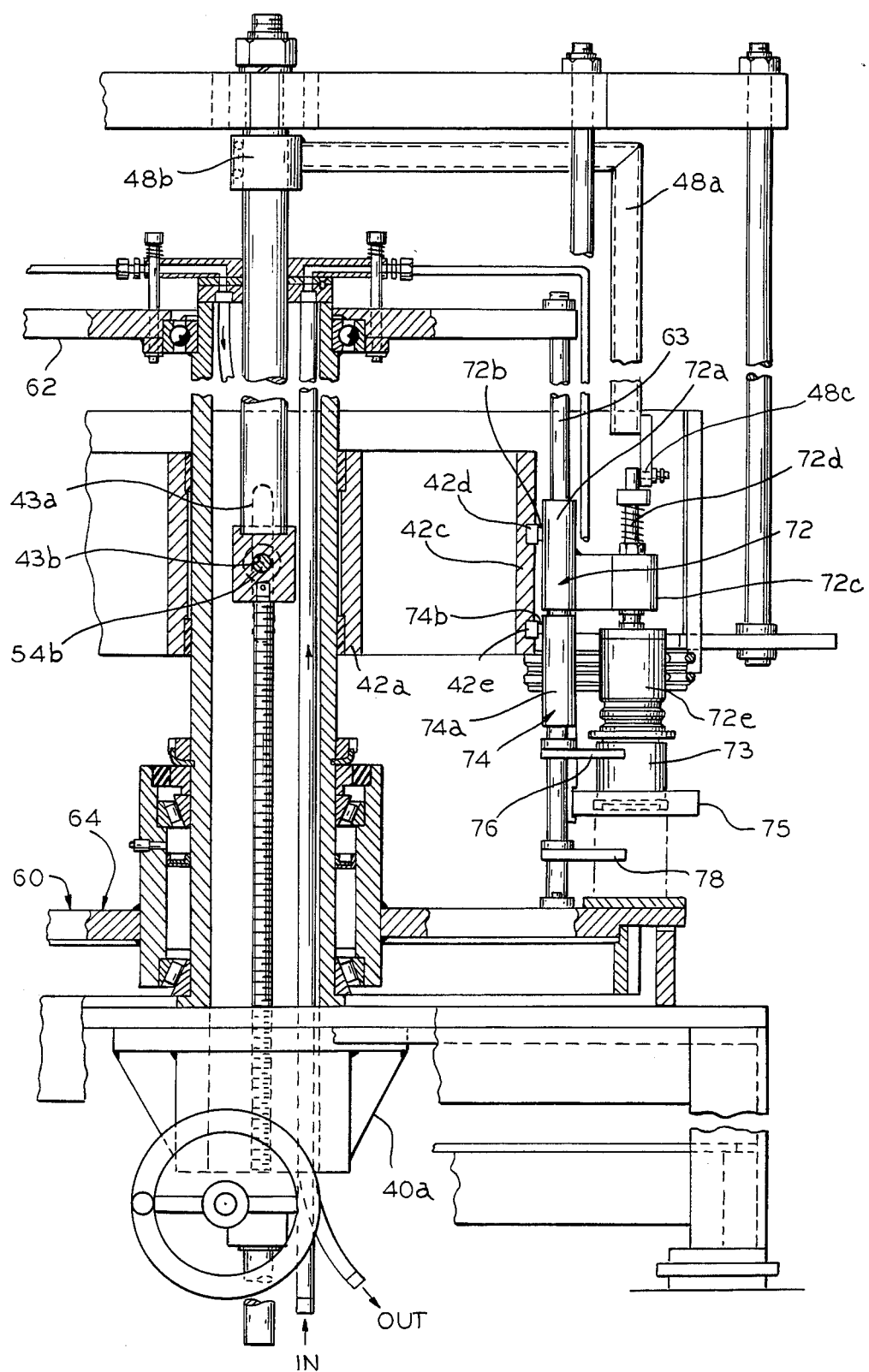
FIG. 4 is a fragmentary vertical cross section of a portion of the structure illustrated in FIG. 3.
Figure 6:
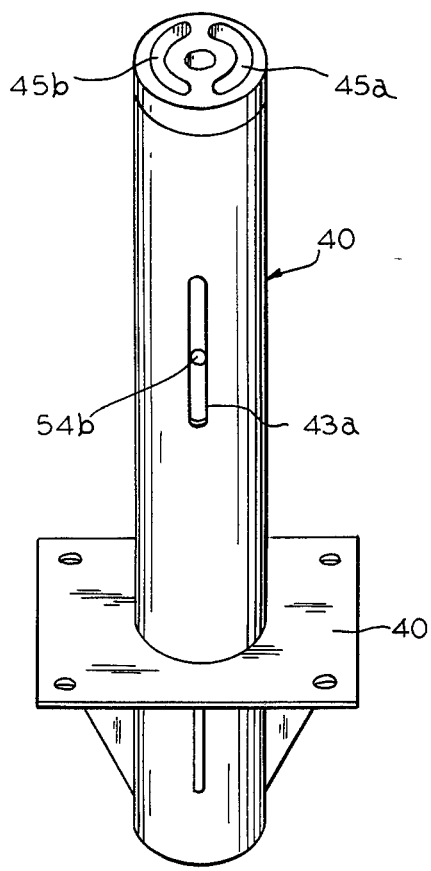
FIG. 6 is a fragmentary perspective view of portions of the center column assembly structure illustrated in FIGS. 2-4.
Figure 9:
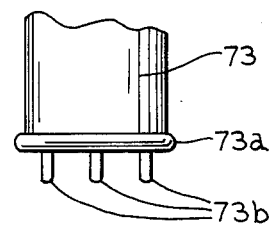
FIG. 9 is a fragmentary side elevational view of a chuck structure illustrated in FIG. 4.

As best seen in FIGS. 4 and 6 the principal part of center column assembly CCA is a vertically disposed, hollow, generally cylindrical, center column 40 having, formed integrally with its lower end, a flange structure 40a which is bolted to underside of upper deck 16 of machine base MB.

Center column assembly CCA includes a barrel cam hub 42a which is mounted concentrically on an upper portion of center column 40 for limited axial or vertical movement, relative thereto. Spaced outwardly from and concentric with hub 42a, and connected thereto by integral, radial webs 42b, is a generally cylindrical barrel cam outer ring 42c, within which are cut a pair of circumferential, upper and lower cam tracks 42d and 42e. The cam tracks engage cam followers which control the functions of the work station tooling with respect to the can ends and can bodies, respectively, An upper area of center column 40 presents pair of diametrically opposed, vertically extending slots 43a adapted to receive connecting block pin 54b of the jack screw sub-assembly 50 for a purpose hereinafter described. Likewise barrel cam hub 42a presents a pair of diametrically opposed holes 43b, aligned with respective slots 43a, and also adapted to receive portions of connecting block pin 54b.

Figure 7:
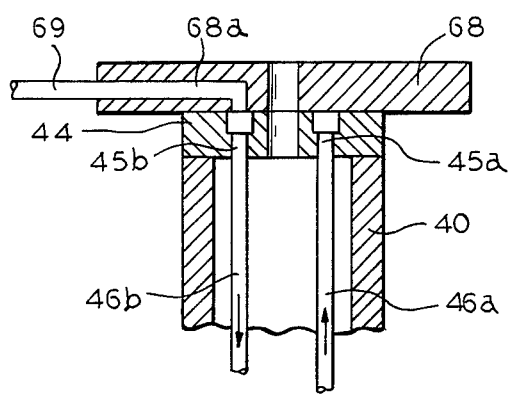
FIG. 7 is a fragmentary transverse vertical sectional view of a portion of the center column assembly structure illustrated in FIG. 3.
Figure 8:
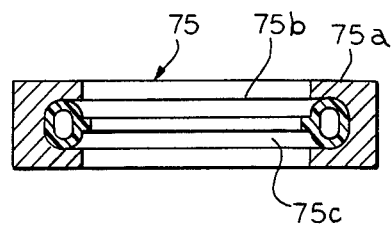
FIG. 8 is a fragmentary view in vertical cross section of a clamp structure illustrated in FIG. 4.

As best seen in FIG. 7, the top of hollow center column 40 is closed by a flat, round cap 44, which has a pair of curved ports 45a and 45b extending therethrough for cooperation with a rotating manifold disk 68 of the turret assembly in a manner hereinafter described. Ports 45a and 45b are connected to pressure and vacuum pipes 46a and 46b, respectively, which extend through center column 40 and base upper deck 16 to the air supply and a vacuum pump 14 located in the machine base.

Center column assembly CCA also includes a generally L-shaped stripper actuator arm 48a extending outwardly and downwardly from a collar 48b sleeved over shaft 54c which extends upwardly from center column 40 through cap 44. Attached to the outer and lower end of arm 48a is a stripper cam follower 48c, the purpose of which is described later in the specification.

DESCRIPTION OF THE JACK SCREW SUB-ASSEMBLY

As best seen in FIGS. 3 and 4, another component of the center column assembly CCA is a jack screw sub-assembly, indicated generally at 50, which facilitates the vertical adjustment of the belt-drive/burner assembly, in a manner hereinafter described, to accommodate different can body heights.

Jack screw assembly 50 includes a screw 52 which extends vertically through the middle of hollow center column 40 from a gear box 56 mounted on the lower edge of center column 40 to an upper section of column 40, where it is secured to a connecting block 54a. Block 54a includes a pin 54b projecting outwardly from opposite sides thereof for receipt in slots 43a and holes 43b center column 40 and barrel cam hub 42a, respectively. Formed integrally with or rigidly secured to and projecting upwardly from connecting block 54a is a spider shaft 54c which is secured to a spider-type portion or cross shaped bracket 80a of the suspension structure 80 of the belt-drive/burner assembly BBA. Below base upper deck 16 a hand wheel shaft 58a extends horizontally from gear box 56 to a hand wheel 58b located outside of base MB.

Thus, it will be understood that, as hand wheel 58b is turned one way or the other, jack screw 52 moves upwardly or downwardly carrying with it connecting block 54a, pin 54b, cam hub 42a, spider shaft 54c and suspension structure 80 of the belt-drive/burner assembly BBA. As pin 54b rides in slots 43a of center column 40, the latter is not affected; however, as the connecting block 54a and pin 54b move vertically, barrel cam hub 42a, web 42b, ring 42c, and station tooling slides move with it. This height adjustment is only required when it is desired to change the height of the can bodies to which the ends are attached.

DESCRIPTION OF THE TURRET ASSEMBLY

The turret assembly TA, as best seen in FIGS. 3 and 4, includes a carrousel-like turret, indicated generally at 60, which comprises a pair of round, upper and lower turret plates 62 and 64, respectively, which are connected to each other by a plurality of vertical shafts 63 circumferentially arranged around the peripheries of the plates. In the particular machine illustrated and described herein there are 36 shafts arranged in 18 pairs, with each pair of shafts carrying a tooling sub-assembly 70, as hereinafter described. Although the exact number of pairs of shafts may not always be the same, for purposes of the present invention structure, it was found that by having 18 work stations on the turret and 9 pockets on the previously mentioned star wheels 36 and 38, a two to one ratio of rotation of the star wheels to the turret has proven to be extremely satisfactory.

Lower turret plate 64 is secured to driven ring gear 66, which, as previously mentioned, is driven by driver pinon gear 34 mounted on and rotatable with star wheel shaft 30.

Thus, as gears 34 and 66 rotate in opposite directions, star wheels 36 and 38 rotate clockwise, while turret 60 rotates counter-clockwise, as best seen in FIG. 3.

Turret assembly TA also includes a rotatable disk 68 which is mounted on non-rotatable center column cap 44 for cooperation therewith to form an air manifold arrangement. Disk 68 has a plurality of radially disposed ports 68a each of which is connected to a tube 69 which is in turn connected to the air clamp mechanism of one of the tooling sub-assemblies 70, as hereinafter described. As disk 68 rotates its ports are alternately aligned with either the air pressure or vacuum port 45a or 45b, respectively, of center column cap 44.

DESCRIPTION OF THE TOOLING SUB-ASSEMBLY

Figure 5:
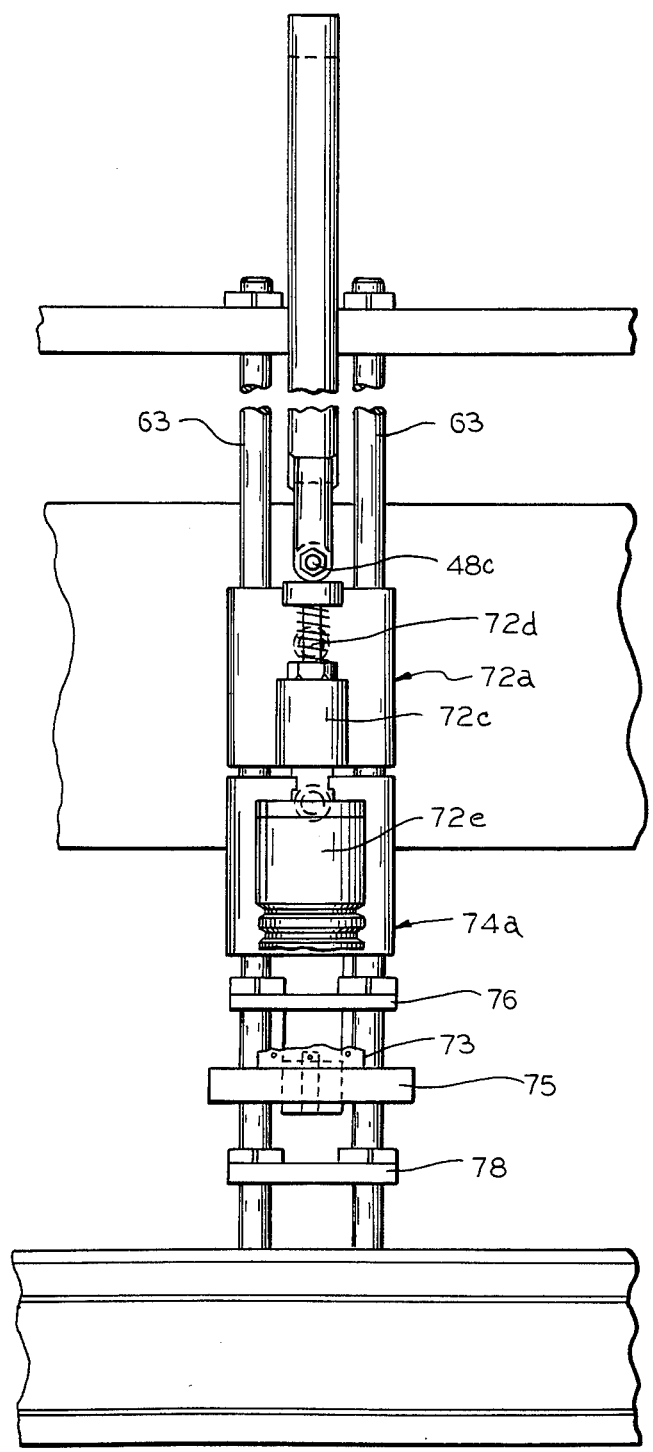
FIG. 5 is a fragmentary side elevational view of a portion of the tooling sub-assembly structure illustrated in FIG. 4.

The work station tooling or end attaching mechanism comprises 18 identical tooling units 70, each of which is mounted on a pair of shafts 63 extending between upper and lower turret plates 62 and 64. As best seen in FIGS. 4 and 5, each unit or, set of tooling 70 comprises a pair of upper and lower slides 72 and 74, respectively, and a pair of upper and lower end and body captivators 76 and 78, respectively.

Upper slide 72 includes a block 72a mounted on a pair of shafts 63 for vertical movement as controlled by a cam follower 72b carried thereon which rides in the upper cam track 42d of barrel cam outer ring 42c. As the turret revolves about the center column 40 and cam ring 42c, the upper slide 72 moves up and down in accordance with a pre-determined program.

Upper slide 72 also includes a hollow spindle 72c, which is fixed to slide block 72a and is capable only of vertical motion with respect to turret 60, which, of course, does revolve about the center column 40.

Disposed to extend through spindle 72c is a vertically extending stripper rod 72d, the upper portion of which is engageable from time to time with the stripper cam follower 48c, on the lower, outer end of stripper actuator arm 48a.

Mounted concentrically on the outside of spindle 72c is a chuck bearing housing 72e which in turn has, readily detachably mounted on the underside thereof, a chuck 73 adapted to grip and rotate plastic can ends E as hereinafter described in connection with the operation of the machine. Chuck bearing housing 72e is rotatably mounted on the related spindle 72d, so that it is free to rotate or spin about its vertical axis when engaged by a non-moving or a moving belt, as described hereinafter.

Chuck 73 is mounted to the underside of bearing housing 72e for quick release, so when it is decided to use the machine for different size can bodies, replacement of the chuck is a relatively easy matter. The chuck is, of course, secured to the bearing housing, so that, as the housing is rotated or spun by either of the external friction belt means, the chuck will also be rotated.

At its lower end chuck 73 is provided with a peripheral outwardly projecting lip 73a, which has a diameter slightly larger than the related portion of a can end, so that when the chuck is moved downwardly onto an end, the end will snap over the lip and remain attached to the underside of the chuck until it is has been stripped away. The chuck is also provided, on its underside, with a plurality of, preferably three, downwardly projecting pins 73b adapted to engage lugs of a plastic can end and rotate the end as the chuck rotates or spins.

As best seen in FIGS. 4 and 5, lower slide 74 includes a slide block 74a mounted on the same pair of shafts 63, under related upper slide block 72a, for vertical movement as controlled by a cam follower 74b carried thereon which rides in lower cam track 42e of barrel cam outer ring 42c.

Lower slide 74 also includes a unique, vertically moveable, annular air clamp 75 for holding a can body snugly and preventing it from being rotated while the related can end is being spun by the chuck to weld the body and end together, in a manner hereinafter described.

Air clamp 75 comprises a metal ring 75a which has, on the inside thereof, an annular goove 75b within which is disposed an annular inflatable bellows 75c. When inflated, bellows 75c extends inwardly beyond the inner surface of the ring to reduce the effective diameter of the center opening of the ring and thereby clamp a cylindrical object, such as a can body, and prevent it from turning. Vacuum and positive pressures are transmitted to the bellows to deflate and inflate it by the tube 69 which extends from the air manifold disk 68 located above cap 44 on center column 40.

Each unit of tooling 70 also includes a pair of upper and lower, yoke-shaped captivators 76 and 78, which are fixedly mounted on each pair of shafts 63 under lower slide 74, for engagement with can ends E and can bodies B as they enter the work station area from upper star wheel 36 and feed screw 22, respectively.

DESCRIPTION OF THE BELT-DRIVE/BURNER ASSEMBLY

Figure 10:
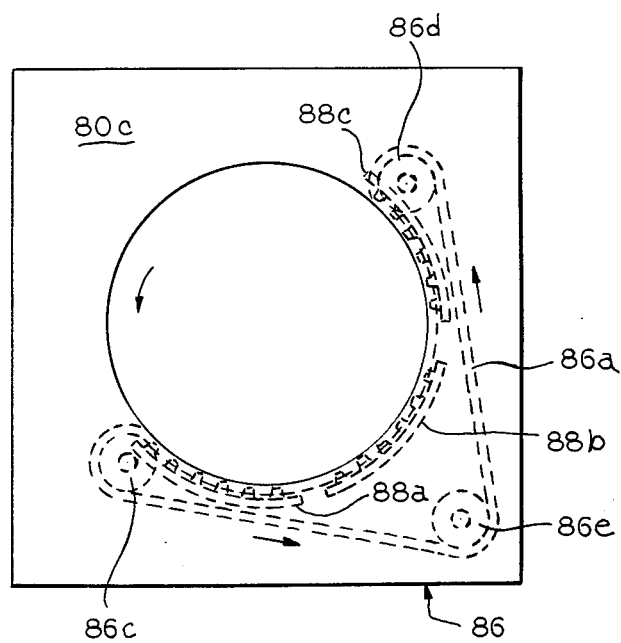
FIG. 10 is a fragmentary top plan view of a portion of the belt-drive/burner assembly structure illustrated in FIG. 2.
Figure 11:
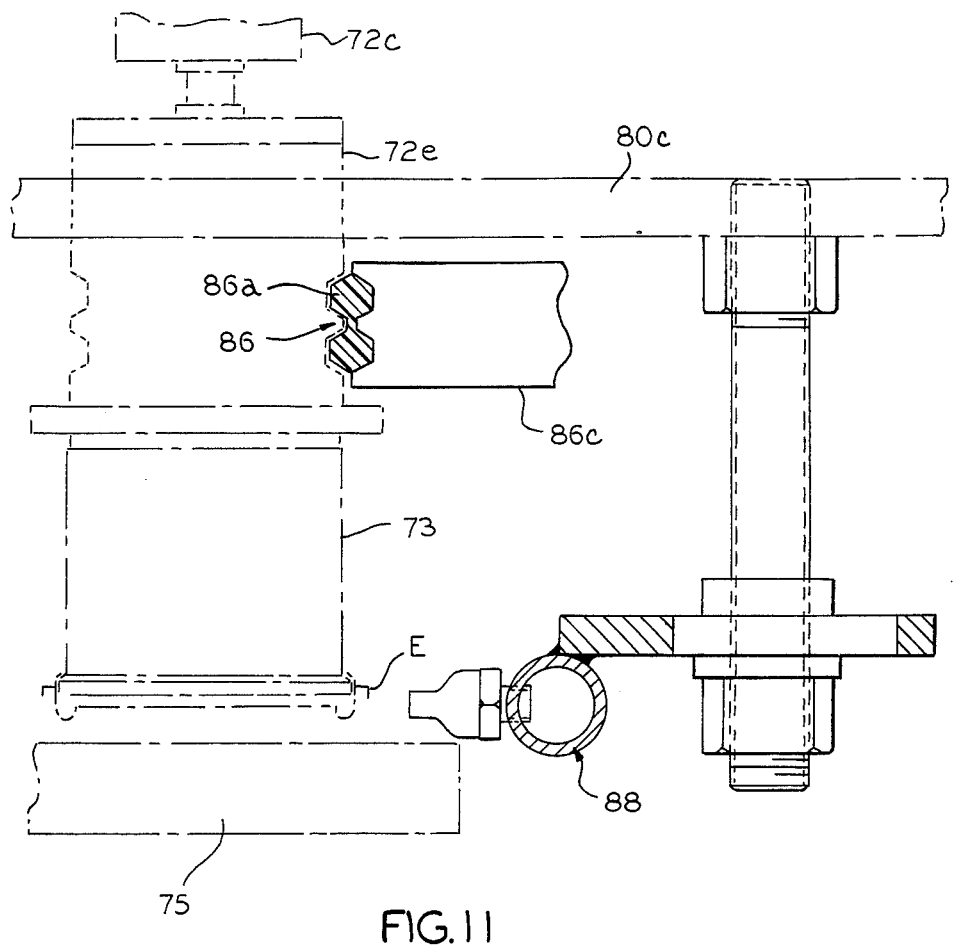
FIG. 11 is a fragmentary side elevation view of a portion of the belt-drive/burner assembly illustrated in FIGS. 2 and 10.

Another major component of the machine is the belt-drive/burner assembly BBA which is best seen in FIGS. 10 and 11. The belt-drive/burner assembly BBA is suspended from the upper end of the center column by means of a suspension structure, indicated generally at 80, which is vertically adjustable by means of the jack screw assembly 50, previously described. The belt-drive/burner assembly, like the center column assembly, does not rotate with the turret assembly TA.

Suspension structure 80 includes a spider or cross-shaped bracket 80a, the center of which is secured to the upper end of spider shaft 54c. Four suspension rods 80b are adjustably connected at their upper ends to the outer ends of bracket 80a. At their lower ends rods 80b are connected to and support a belt-drive/burner plate or platform 80c, which is preferably square and has a large round opening in the center for receipt of the turret assembly TA.

Although plate 80c can be raised or lowered, as previously mentioned, its lateral movement is restricted by a plurality of, preferably four, guide shafts 80d which are secured to and extend upwardly from machine base upper deck 16. Shafts 80d have their upper ends received in bushing blocks 80e mounted on the upper side of platform 80c.

Also, supported from and disposed below platform 80c is dead plate 82 which is positioned under can end feed screw 20, so that, as the feed screw advances the ends E, they slide along the dead plate until they are picked up by upper star wheel 36.

Mounted on top of platform 80c, adjacent the side where the ends enter the work area, is a laterally extending, non-movable belt 84 which engages each chuck bearing housing 72e, as it moves past on the turret 60, causing the housing and attached chuck to rotate or spin slowly until the chuck pins 73b engage upwardly facing lugs on the outer surface of a related can end.

In another location beyond the non-movable belt 84 there is mounted, on platform 80c, a belt-drive system 86 which includes: a preferably double-V belt 86a, driven by a separate drive motor 86b, a driver sheave 86c, a fixed idler sheave 86d, and a take-up idler sheave 86e. Motor 86b is mounted on the upper side of platform 80c; whereas all of the other parts of the belt-drive system 86 are mounted on the underside of platform 80c adjacent the work area or path.

The purpose of belt 86a is to engage the chuck bearing housings, as they revolve with turret 60, and to cause them to rotate or spin rapidly on their respective axes as part of the spin-welding process.

An extremely important component of the belt-drive/burner assembly is the burner system 88, which is also mounted on the underside of platform 80c. The burner system 88 comprises three banks of gas manifolds 88a, 88b, and 88c which direct a series of flames toward portions of the can ends E as they are being carried by and rotated on the chucks 73.

In order to provide for the safety of the operator, there may be supported by the suspension structure 80 and the platform 80c a guard cage, surrounding the turret, as well as such other doors, windows, and related guard devices as may be necessary. Such devices are not shown in the drawings, as they do not form a part of the present invention, and their inclusion would unduly complicate and confuse the drawings.

DESCRIPTION OF THE METHOD AND OPERATION OF THE MACHINE

To describe the operation of the machine, it will be noted that, as previously mentioned, can ends E enter the machine EAM on conveyor C3 where they are picked up and transferred by feed screw 20, over dead plate 82, to upper star wheel 36 which delivers them, one at a time, to the initial work station.

At the same time as the can ends E are entering the work station of the machine the can bodies B are being delivered to the machine EAM by conveyor C4, which is positioned on the same side of the machine as conveyor C3 and which is parallel thereto. The can bodies B are picked up from conveyor C4 by feed screw 22 and delivered to another part of the work station or path as hereinafter described.

Figure 12:
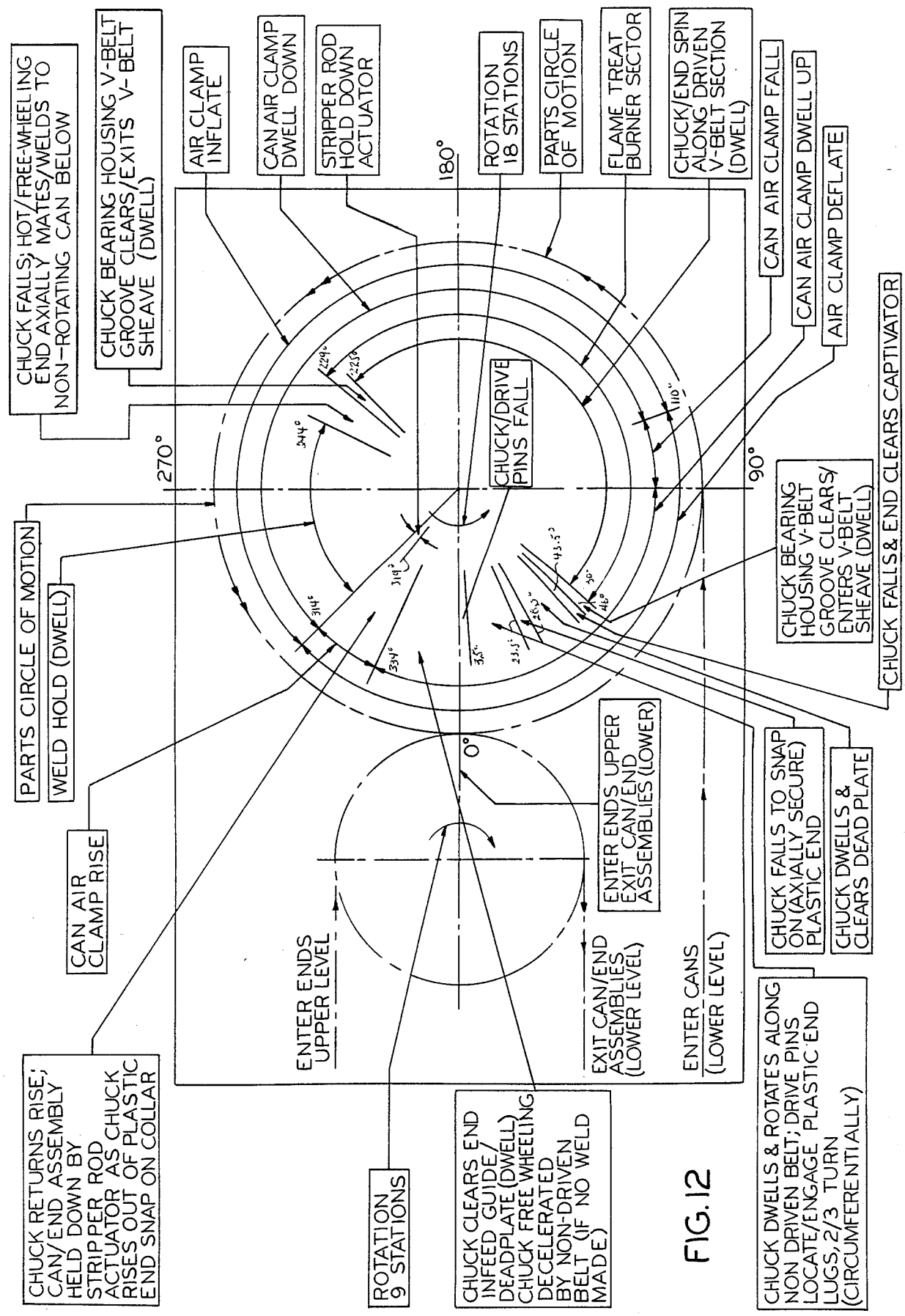
FIG. 12 is a schematic diagram illustrating the operating cycle of the machine embodying features of the invention.

The work of attaching the ends E to the bodies B of the cans is a continuous motion operation that takes place over a 360° path of the turret assembly. Thus, there is really no one work station, as there would be in an intermittent motion machine. The work station or area of the present machine is an arcuate circuit or path as best seen in FIG. 12.

Rotation of both feed screws, both star wheels, and the turret is caused by the main motor 12, which, as previously mentioned is connected to star wheel shaft 30 by gear reducer 12a and coupler 12b.

Feed screws 20 and 22 are connected to the star wheel shaft 30 by means of a drive train that includes: a driver sprocket 24a, timing belt 24b, driven sprocket 24c, gear box 26, and flexible shafts 28a and 28b, respectively.

The star wheels are, of course, mounted on the shaft 30. The lower turret plate 64 is secured to the driven ring gear 66, so that as the star wheel shaft 30 is turned, driver pinion gear 34 turns driven ring gear 66 and plate 64 as well as the other parts of the turret assembly. As best seen in FIG. 3, the star wheel assembly rotates in a clockwise direction; whereas, the turret assembly rotates in a counter-clockwise direction, with the former making two revolutions to each revolution of the turret assembly.

For purposes of describing the work areas of the turret assembly, the area of tangency of the star wheels and the turret will be designated as the initial work area or the 0°/360° point, as shown in FIG. 12.

Although the ends E enter the work area at the 0° point as hereinafter described, the following description of the entire operation cycle will begin with a description of the entry of the can bodies at the 90° point in the work cycle.

It is to be understood that, in the operation described herein, the machine EAM is being used to secure the lower or bottom ends on the can bodies which will thereafter be filled with a product before the upper ends are applied. The machine is capable, of course, of attaching either the lower (first) or upper (second) end to a can, because the novel air clamp, which holds the cans in place during the attachment process, grips the outer surface of the can. This is not true in the case of some machines which rely on an expanding, internal mandrel to grip the inside of a can.

Accordingly, as the can bodies B enter the work area on conveyor C4, the can bodies are upside down. As they leave conveyor C4, they are picked up by feed screw 22 and delivered to the work area at the 90° point. Here each can body is engaged by a lower captivator 78 and swept onto the lower turret plate 64 by the captivator, with the aid of another curved guide rail, until the can body is grasped by an air clamp 75.

Between 90° and 110° an air clamp is lowered to surround the can body. At 110° the rotation of turret 60 causes the manifold disk 68, in cooperation with center column cap 44, to direct a positive air pressure to the inflatable bellows 75c of air clamp 75. Thus, the bellows expands and the air clamp grips the can body snugly to prevent its rotation as it continues to revolve with turret 60.

As each end E leaves feed screw 20 it is picked up in a pocket 37 of upper star wheel 36 and swept across dead plate 82 until it reached the starting point of the work cycle at 0°. Here it is engaged by upper captivator 76, which revolves with turret 60. Upper captivator 76, with the aid of a curved guide rail, carries end E around the first portion of the circular work path until the end is engaged by and temporarily held by a chuck 73, which is positioned above the can end and is revolving with it on turret 60.

Between 0° and 3.5° of the work cycle revolution of the turret 60, a chuck 73 lowers toward an end E. Between 3.5° and 23.5° bearing housing 72e, to which the chuck 73 is detachably secured, is engaged, as it revolves with turret 60, by the non-movable belt 84 mounted on platform 80c of the belt-drive/burner assembly BBA.

This engagement causes bearing housing 72e and the attached chuck 73 to rotate slowly or roll, at the same time it is revolving with turret 60. The combination of the rotation of the chuck and its revolution with the turret is actually a double or planetary type of movement. As the chuck rotates slowly the pins 73b projecting from the lower end of the chuck engage the drive lugs projecting outwardly from the can end, so that when the chuck is thereafter rotated more rapidly the end will also be spun rapidly.

From 23.5° to 28.5° the chuck lowers further, and, finally at 28.5°, the chuck extended lower lip 73a has snapped into end E to temporarily attach the end to the chuck.

From 28.5° to 43.5° the chuck and end are moved past and completely clear dead plate 82. From 43.5° to 46° the chuck lowers still further until the end clears upper captivator 76.

From 46° to 50° the chuck bearing housing 72e clears the belt driver pulley or sheave 86c.

From 50° to 225° the chuck bearing housing is now in engagement with and rotated rapidly or spun by the drive belt 86a, as the tooling continues to revolve on turret 60.

As the can end E is being rotated rapidly or spun with chuck 73, it is moving along side the burner system 88 and is being flame treated to expedite the spin welding process, as hereinafter described.

At the same time the related can body B, to which the end E will be attached, has entered the work at 90°, and, from 90° to 110°, has been secured by an air clamp 75.

From 225° to 229° the chuck 73 and end E leave the belt drive/burner system and chuck bearing housing 72e clears the fixed idler pulley or sheave 86d. At this point, although there is no contact or engagement between the chuck housing and the belt, the housing and attached chuck with end E are still rotating at freely a relatively high speed because of the rotational kinetic energy.

From 229° to 244° the chuck and hot end E continue to rotate rapidly or spin as the end E is lowered into an adjacent can body B. The spinning continues until the kinetic energy is dissipated into frictional heating, and the end and body are welded together, the combination body and end being hereafter referred to as BE.

From 244° to 314° can BE continues to revolve with the turret 60 without spinning or rotating action. This allows time for the bond or weld to solidify.

From 280° to 314° the relative positions of the air manifold disk 68 and outer column cap 44 cause a vacuum or negative pressure to be directed from the inflatable bellows 75c of air clamp 75, so that the can body will be released from the air clamp.

At 314° stripping of the can BE from the chuck begins, as stripper cam follower 48c supported by stripper activator arm 48a engages the upper end of stripper rod 72d which extends through the spindle, bearing housing, and chuck.

From 314° to 319° the stripper rod and can BE are held down by cam follower 48c as the chuck housing and chuck start to move upwardly by the cam action of the upper slide in preparation for the next cycle. This action strips or snaps the end body BE from the chuck.

As the tooling is moved away from the finished product, the can body with attached end BE, is swept by the lower star wheel 38, with the aid of a curved guide rail, out of the work area path and onto conveyor C5, where it is transferred to a palletizer in a shipping or storage area.

Thus, the entire operation is one of continuous motion which accommodates a high speed production at a rate not attainable by conventional attaching equipment.

What is claimed is:

1. In a continuous motion apparatus for attaching to one end of a cylindrical body member, a preformed, round end closure member, having a plastic rim area, the combination of:
(a) a base;
(b) a center column assembly mounted on said base and extending upwardly therefrom;
(c) a turret assembly mounted on said base and adapted to revolve about said center column assembly;
(d) means for revolving said turret assembly about said center column assembly;
(e) said turret assembly including a plurality of sets of tooling for attaching said end closure members to said body members;
(f) each of said sets of tooling including:
 (i) chuck means for grasping one of said closure members to accommodate its rotation about its axis;
 (ii) clamp means for grasping one of said body members to prevent its rotation about its axis;
 (iii) said chuck and clamp means being mounted for relative axial movement;
(g) means for rotating said chuck means about its axis;
(h) means for heating the rim area of said end closure member, as it is being rotated with said chuck means;

(i) means for effecting the relative axial movement of said chuck means and clamp means toward and away from each other;

(j) means for transferring said members toward and away from said sets of tooling.

2. An apparatus according to claim 1, wherein said chuck means includes a generally cylindrical chuck having at the lower end thereof an annular retaining lip projecting radially outward therefrom and adapted to have a portion of an end closure member snapped over it to retain said member on said chuck means.

3. An apparatus according to claim 1, wherein said chuck means includes a generally cylindrical chuck having projecting downwardly from the lower end thereof a plurality of pins adapted for engagement with related lugs on an end closure member for the purpose of rotating said end closure member.

4. An apparatus according to claim 1, wherein said chuck means includes:
(a) a generally cylindrical chuck adapted to hold on the lower end thereof an end closure member;
(b) a generally cylindrical housing, to which said chuck is readily detachably secured, and which is mounted for vertical and rotational movement on said turret assembly.

5. An apparatus according to claim 1, wherein said clamp means includes:
(a) an annular rigid housing presenting an annular channel open toward the inner periphery of said housing;
(b) a hollow, flexible, inflatable, toroidal-shaped tube positioned within said housing channel and capable of being inflated until portions of it extend out of said channel to snugly engage a container body member.

6. An apparatus according to claim 1, and including stripper means for removing a closure member and attached body member from said chuck means.

7. An apparatus according to claim 6, wherein said stripper means includes a cam actuated elongated member disposed to extend vertically through said chuck means to engage and hold said closure members down while said chuck means are moving upward to thereby separate the former from the latter.

8. An apparatus according to claim 1, wherein said means for rotating said chuck means about its axis includes a stationary friction member engageable with said chuck means as the latter is carried by the turret assembly past the former.

9. An apparatus according to claim 8, wherein said stationary friction member includes a belt mounted on top of a platform supported above said base.

10. An apparatus according to claim 1, wherein said means for rotating said chuck means about its axis includes a driven friction member engageable with said chuck means as the latter is carried by the turret assembly past the former.

11. An apparatus according to claim 10, wherein said driver friction member includes a belt mounted on the underside of a platform supported above said base.

12. An apparatus according to claim 1, wherein said heating means includes at least one gas manifold positioned adjacent said turret assembly and adapted to direct a flame toward said end closure member as it is being rotated on said chuck means.

13. An apparatus according to claim 12, wherein said gas manifold is mounted on the underside of a platform supported above said base.

14. An apparatus according to claim 1, wherein said means for effecting relative axial movement of said chuck means and said clamp means includes cam follower means, carried by said set of tooling, and which is engageable with cam track means supported by said center column assembly.

15. An apparatus according to claim 1, wherein said means for transferring said members includes:
(a) a pair of feed screws rotatable about horizontal axes;
(b) a pair of star wheels rotatable about vertical axes.

16. An apparatus according to claim 15, wherein said feed screws and said wheels are mounted over said base and adjacent said turret assembly.

17. An apparatus according to claim 15, wherein said feed screws are located:
(a) at the same end of said base;
(b) on opposite sides of said turret assembly;
(c) in parallel relation with each other.

18. An apparatus according to claim 1, wherein said turret assembly comprises:
(a) a pair of vertically spaced, horizontally disposed, upper and lower, plates;
(b) a plurality of vertically disposed rods extending between said upper and lower plates;
(c) said sets of tooling being mounted on said rods for vertical movement.

19. An apparatus according to claim 1, wherein said center column assembly includes means for adjusting the vertical height of said:
(a) sets of tooling;
(b) means for rotating said chuck means;
(c) means for heating said end closure member.

20. An apparatus according to claim 19, wherein said center column assembly includes:
(a) a hollow shaft extending upwardly from said base;
(b) an adjustable cam hub mounted on said shaft for vertical movement relative thereto;
(c) a cam track cylinder secured to said hub and spaced radially outward therefrom.

21. An apparatus according to claim 1, and including a belt-drive burner assembly comprising:
(a) a suspension structure supported by said center column assembly and including a horizontally disposed platform positioned over said base;
(b) said platform having attached thereto and supported thereby:
(i) said means for rotating said chuck means about its axis;
(ii) said means for heating said end closures member.

22. An apparatus according to claim 21, wherein said chuck rotating means includes:
(a) stationary friction means mounted on the upper side of said platform;
(b) movable friction means mounted on the underside of said platform.

23. An apparatus according to claim 21, wherein said suspension structure is operatively connected to a shaft of said center column assembly which is mounted for vertical movement to accommodate adjusting the height of said platform.

24. An apparatus according to claim 21, wherein said heating means includes at least one gas manifold mounted on the underside of said platform.

25. An apparatus according to claim 1, including a star wheel assembly for revolving said turret assembly and for transferring said members toward and away from said sets of tooling comprising:
(a) a vertical shaft;
(b) motor means for rotating said shaft;

(c) a pair of member transferring feed screws operatively connected to said shaft;
(d) a pair of member transferring star wheels mounted on said shaft;
(e) a driver gear mounted on said shaft and engageable with a driven gear connected to said turret assembly.

26. In a continuous motion apparatus for attaching to one end of a container body member, a preformed round end closure member, having a plastic rim area, the combination of:
(a) a base;
(b) a non-rotatable center column assembly mounted on said base;
(c) a generally cylindrical turret assembly mounted on said base outwardly of and concentric with said center column assembly for revolutionary movement therearound;
(d) said turret assembly including a plurality of sets of tooling for attaching said members to each other;
(e) a star wheel assembly mounted on said base adjacent said turret assembly for assisting the movement of said end closure and body member toward and away from said turret assembly;
(f) a belt-drive/burner assembly mounted on said base around said turret assembly for supporting means for rotating said end closure members about their axes and subjecting them to heat treatment while they are being processed by said tooling.

27. In a continuous motion apparatus for attaching to one end of a cylindrical body member, a preformed round end closure member, having a plastic rim area, the combination of:
(a) a base;
(b) a non-rotatable center column assembly mounted on said base;
(c) a generally cylindrical turret assembly mounted on said base outwardly of and concentric with said center column assembly for revolutionary movement therearound;
(d) said turret assembly including a plurality of sets of tooling for attaching said members to each other;
(e) a star wheel assembly mounted on said base adjacent said turret assembly for assisting the movement closure and body member toward and away from said turret assembly;
(f) a belt-drive/burner assembly mounted on said base around said turret assembly for supporting means for rotating said closure members about their axes and subjecting them to heat treatment while they are being processed by said tooling.

* * * * *